(Model.)
G. MURRAY & M. A. GIBBS.
APPARATUS FOR THAWING GIANT POWDER AND NITRO GLYCERINE.
No. 276,863. Patented May 1, 1883.
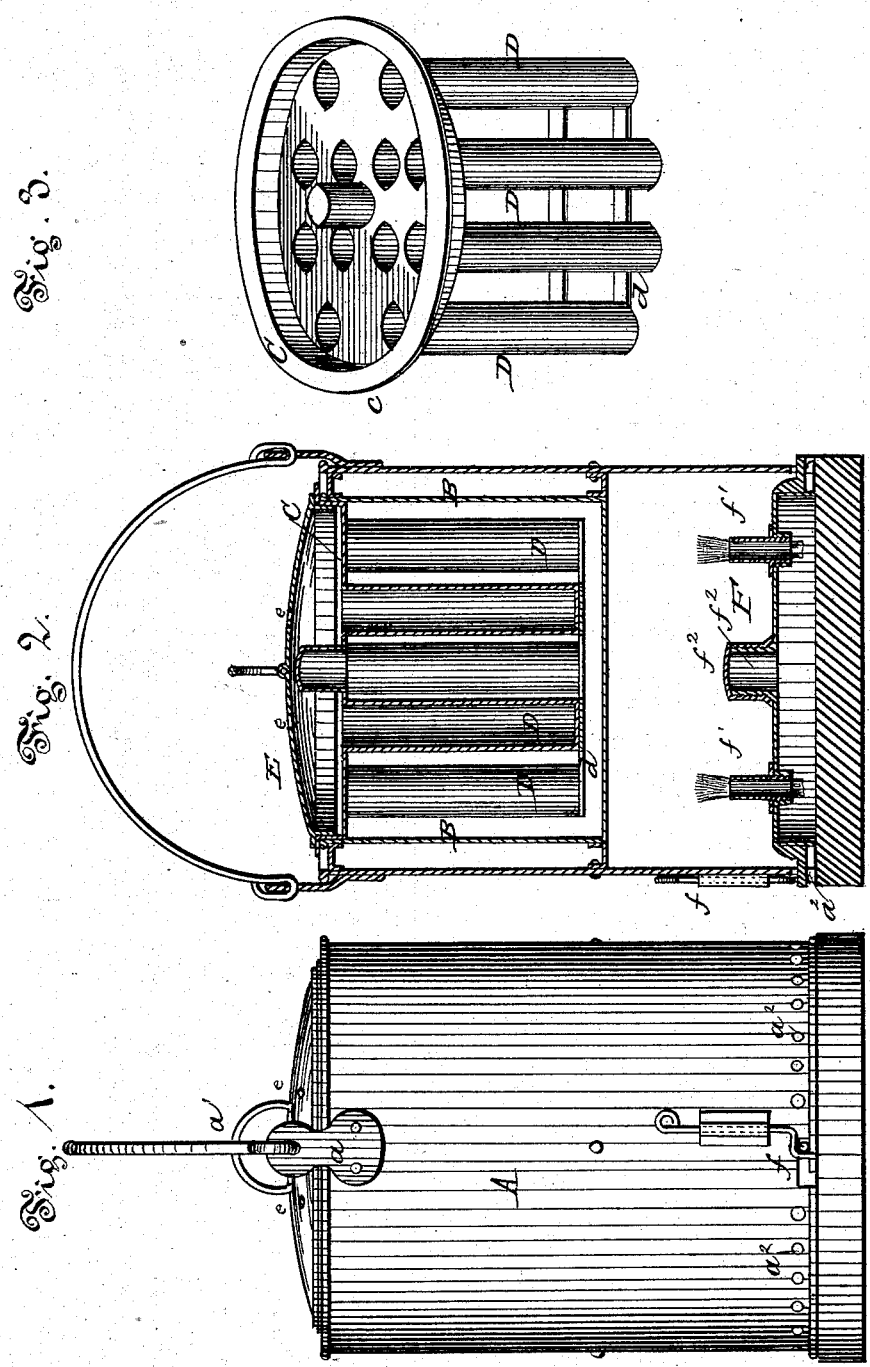
WITNESSES:
Fred. G. Dieterich
E. C. Walford
INVENTOR.
Gordon Murray
and Mahlon A Gibbs
by DeWitt C. Allen
ATTORNEY.

UNITED STATES PATENT OFFICE.

GORDON MURRAY AND MAHLON A. GIBBS, OF NEGAUNEE, MICHIGAN.

APPARATUS FOR THAWING GIANT-POWDER AND NITRO-GLYCERINE.

SPECIFICATION forming part of Letters Patent No. 276,863, dated May 1, 1883.

Application filed January 13, 1883. (Model.)

*To all whom it may concern:*

Be it known that we, GORDON MURRAY and MAHLON A. GIBBS, citizens of the United States, residing at Negaunee, in the county of Marquette and State of Michigan, have invented certain new and useful Improvements in Apparatus for Thawing Giant-Powder and Nitro-Glycerine; and we do hereby declare the following to be a full, clear, and exact description of the invention, such as will enable others skilled in the art to which it appertains to make and use the same.

This invention relates to certain new and useful improvements in apparatus for thawing giant-powder, nitro-glycerine, and other high explosives used in mining and other operations, to avoid accidental explosions, resulting mainly from the shifts resorted to by miners to warm their powder or other explosive material, and loss of time consequent to the workmen in warming said explosives.

The object of the present invention is the production of an apparatus in which the hot water used in thawing the powder or other explosives may be heated in the receptacle containing the cartridge-holders, thereby enabling the apparatus to be used any distance under the ground, where hot water cannot be obtained; and to this end the invention consists in novel features of construction and combination of parts, all as will be hereinafter fully described, and set forth in the claims hereto annexed.

Referring to the accompanying drawings, Figure 1 is a side view; Fig. 2, a vertical cross-section, and Fig. 3 a detail view.

In the drawings, A represents a galvanized-iron receptacle, of circular or other suitable form and size, and provided with ears $a$ for a bail, $a'$, by which it may be conveniently carried in the hand of the miner or workman.

B represents an interior vessel, which may be permanently or removably secured therein, leaving a surrounding air-space between it and the receptacle A.

C represents a dish-shaped vessel, having an outwardly-projecting flange, $c$, around its upper edge, by which it is suspended and supported within and from the top edge of the vessel B. D are a series of tubes closed at their lower ends and connected by metallic supporting-bands $d$, said tubes projecting up through and secured to the bottom of the vessel C. These tubes D extend downward within the vessel B to within a short distance of its bottom, and they are arranged at equal distances apart and from the sides and bottom of the vessel B, so that all parts of the tubes are equally exposed to the action of the hot water contained in the vessel B.

Over vessel B, and upon and within vessel C, fits a cover, E, having a series of vent-holes, $e$, through it for the escape of gas from the powder produced while thawing the same, and thereby obviating any explosion which might occur if the cover were air-tight.

F represents a lamp adapted to be secured in the bottom of receptacle A by the usual bayonet-and-lock joint and a catch, $f$, all as clearly shown in Fig. 1. This lamp is provided with a series of burners, $f'$, by which the flame may be more equally thrown over the bottom surface of the vessel B, which contains the water to be heated, and a central opening, $f^2$, closed by a screw-cap, for filling the lamp with oil. This lamp is also provided with a wooden bottom to prevent bruising of can.

The receptacle A is provided with a series of air-inlet openings, $a^2$, through it, near its bottom, to supply air to the lamp, and the air-space between the vessel B and receptacle A permits the necessary draft and escape of any products of combustion. The interior vessel, B, should be made of copper to withstand the heat.

The apparatus is used as follows: The vessel C, with cartridge-holders D, is first removed from the vessel B, which latter vessel is then filled with the necessary amount of water and the cover placed thereon. The lamp is then lighted and kept so until the water in vessel B is properly heated, after which the lamp is extinguished, when the cover is removed and the vessel C, containing the cartridge-holders D, (which, during the above operation, may have been filled with powder,) is placed in vessel B and the cover again put in position, when the powder will soon become thawed by the action of the hot water surrounding the tubes and ready for use.

By extinguishing the lamp before placing in the vessel containing the hot water the vessel containing the cartridge-holders, all danger of accidental explosions by the use of the lamp is avoided.

By removing vessel C a can containing nitroglycerine may be suspended in the hot-water vessel and thawed in a similar manner to powder.

The advantages of this apparatus are obvious, as water can always remain in vessel B, ready for heating, and thereby use the apparatus under the ground, where the hot water could not otherwise be obtained, and any distance under ground, where, if hot water were obtained from the outside, it would cool before it could be used; and, further, men would not have to climb ladders to the surface to find hot water to thaw the explosives for use, but save time and danger of going a long distance down with it after being thawed.

We do not wish to be understood as claiming, broadly, in the present case the combination, with a hot-water receptacle, of a series of cartridge-holders suspended therein and a cover for fitting over the tops of said holders, as it forms the subject-matter of another application of ours for Letters Patent filed simultaneously with this.

Having thus fully described our invention, what we claim as new, and desire to secure by Letters Patent, is—

1. The combination of receptacle A, lamp F, interior vessel, B, cartridge-holders D, and a cover for the same, substantially as and for the purpose herein shown and described.

2. The combination of receptacle A, lamp F, vessel B, arranged inside of said receptacle, removable vessel C, provided with cartridge holders or tubes D, and the cover C, substantially as and for the purpose herein shown and described.

3. The combination, with a hot-water receptacle or vessel B and a series of cartridge-holders, D, suspended therein, of a cover provided with a series of vent-holes, substantially as and for the purpose herein shown and described.

4. The combination of the receptacle A, having a series of air-inlet openings, vessel B, arranged therein to leave a surrounding air-space between it and said receptacle, vessel C, provided with a series of cartridge holders or tubes D, cover E, and a lamp removably secured in said receptacle and provided with a wooden bottom, substantially as and for the purpose herein shown and described.

In testimony whereof we affix our signatures in the presence of two witnesses.

GORDON MURRAY.
MAHLON A. GIBBS.

Witnesses:
THOMAS CARMICHAEL,
JNO. SMITH.